United States Patent
Levin et al.

(10) Patent No.: US 10,386,165 B1
(45) Date of Patent: Aug. 20, 2019

(54) FLEXIBLE ENERGY MANAGEMENT KILL VEHICLE FOR EXO-ATMOSPHERIC INTERCEPT

(71) Applicant: LOCKHEED MARTIN CORPORATION, Bethesda, MD (US)

(72) Inventors: Michael Levin, Half Moon Bay, CA (US); Jacob R. Boettcher, Half Moon Bay, CA (US); John Cromie, Menlo Park, CA (US); Douglas Discher, Redwood City, CA (US); Yu Gyone Hwee, Fremont, CA (US); Nathan Larry Johnson, San Jose, CA (US); Robert Kinser, Redwood City, CA (US); Leo Laux, Half Moon Bay, CA (US)

(73) Assignee: Lockheed Martin Corporation, Bethesda, MD (US)

(*) Notice: Subject to any disclaimer, the term of this patent is extended or adjusted under 35 U.S.C. 154(b) by 242 days.

(21) Appl. No.: 15/462,776

(22) Filed: Mar. 17, 2017

Related U.S. Application Data

(60) Provisional application No. 62/310,593, filed on Mar. 18, 2016.

(51) Int. Cl.
| | |
|---|---|
| *F42B 15/01* | (2006.01) |
| *F42B 10/66* | (2006.01) |
| *F02K 9/80* | (2006.01) |
| *F41G 7/22* | (2006.01) |
| *F42B 15/00* | (2006.01) |
| *F41G 7/00* | (2006.01) |

(52) U.S. Cl.
CPC ............ *F42B 15/01* (2013.01); *F42B 10/661* (2013.01); *F42B 10/666* (2013.01); *F02K 9/805* (2013.01); *F41G 7/2213* (2013.01)

(58) Field of Classification Search
CPC ...... F42B 15/01; F42B 10/666; F42B 10/661; F42B 10/64; F42B 10/663; F02K 9/805; F41G 7/2213; F03H 1/0087; B64G 1/242
USPC .............................................. 244/3.21, 3.22
See application file for complete search history.

(56) References Cited

U.S. PATENT DOCUMENTS 3,944,172 A * 3/1976 Becker .................. B64G 1/242
244/169
5,062,593 A * 11/1991 Goddard ............... F42B 10/663
244/169

(Continued)

*Primary Examiner* — Bernarr E Gregory
(74) *Attorney, Agent, or Firm* — Morgan, Lewis & Bockius LLP

(57) ABSTRACT

A method and concept for employing a T-sin-alpha kill vehicle with energy flexibility is disclosed. The energy flexibility method applies divert pulses at multiple phases of the kill vehicle flight time and allows for range extension to increase the kill vehicle coverage of targets outside the normal reach, reaction to target updates, removal of navigation error, and homing divert to intercept the target. Each of these capabilities is essential to the successful intercept of exo-atmospheric ballistic targets in their midcourse phase of flight. A flight vehicle includes a main body, a number of attitude control mechanisms, a control unit, a divert system, a sensor unit, and an attitude control system. The divert system provides acceleration of the flight vehicle in a desired direction. The sensor unit tracks a target along a line of sight (LOS) of the sensor unit. The attitude control system maintains an orientation of the main body.

20 Claims, 4 Drawing Sheets

(56) References Cited

U.S. PATENT DOCUMENTS

| | | | | |
|---|---|---|---|---|
| 5,238,204 A | * | 8/1993 | Metz | F42B 10/661 |
| | | | | 244/3.15 |
| 5,456,425 A | * | 10/1995 | Morris | F02K 9/805 |
| | | | | 244/3.22 |
| 6,889,935 B2 | * | 5/2005 | O'Dwyer | F42B 10/661 |
| | | | | 102/439 |
| 7,012,233 B2 | | 3/2006 | Brown et al. | |
| 7,791,006 B2 | | 9/2010 | Hasson et al. | |
| 8,242,422 B2 | * | 8/2012 | Olden | F42B 10/661 |
| | | | | 102/283 |
| 8,575,526 B1 | | 11/2013 | Colvin et al. | |
| 8,735,788 B2 | * | 5/2014 | Preston | F42B 10/661 |
| | | | | 244/3.1 |
| 9,121,680 B2 | * | 9/2015 | Morgan | F42B 10/64 |
| 10,006,445 B2 | * | 6/2018 | Haque | F03H 1/0087 |
| 2004/0124306 A1 | * | 7/2004 | Brown | F42B 15/01 |
| | | | | 244/3.1 |

* cited by examiner

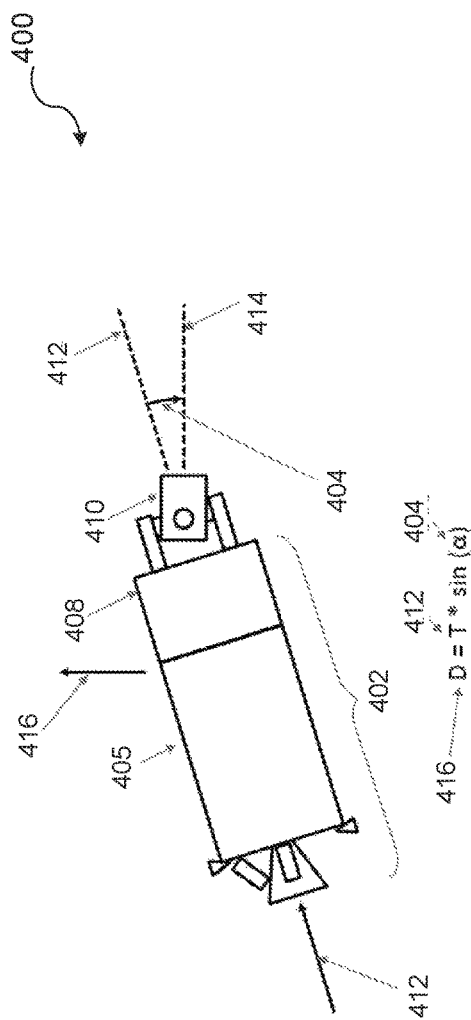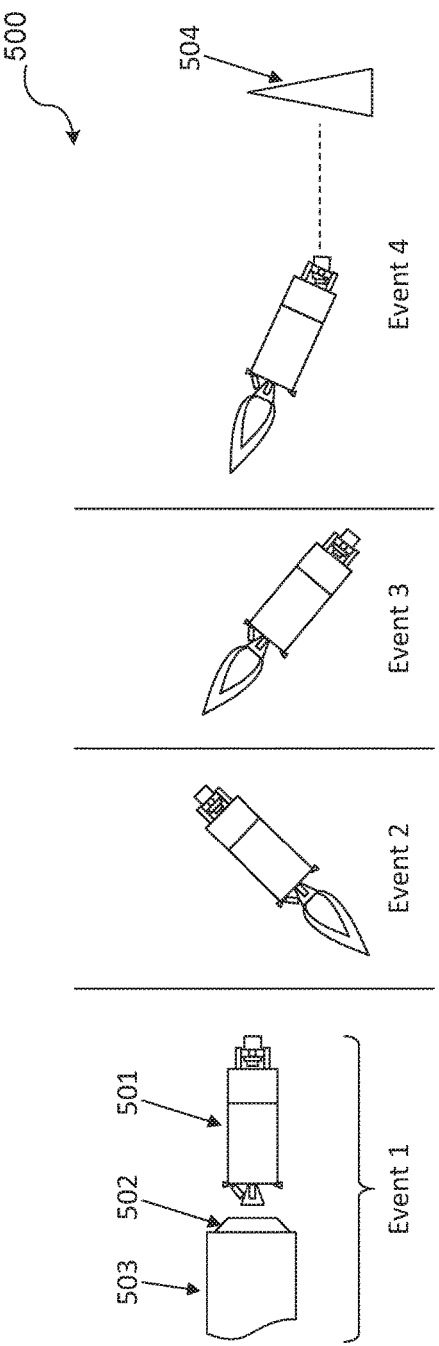
FIG. 4
FIG. 5

FLEXIBLE ENERGY MANAGEMENT KILL VEHICLE FOR EXO-ATMOSPHERIC INTERCEPT

CROSS-REFERENCE TO RELATED APPLICATIONS

This application claims the benefit of priority under 35 U.S.C. § 119 from U.S. Provisional Patent Application 62/310,593 filed Mar. 18, 2016, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to missile defense kill vehicles, and specifically, to kill vehicles with flexible energy management.

BACKGROUND

For many missiles and other flight vehicles such as kill vehicles, the traditional method of providing midcourse energy management flexibility is a cruciform divert and attitude control system (DACS), which can be complex and expensive. For example, liquid propellant cruciform divert systems may use hazardous fuels/oxidizers and may require additional systems to detect and contain leaks. Solid propellant cruciform divert systems, while addressing the toxicity issues, may require pressure management schemes that can waste propellant and reduce the performance of the system. Solid DACS may also require exotic materials to protect valves from excessive heat soak, may have total operating time limitations, reduced total impulse, and significant structural mass for thermal protection. These limitations may severely lower the mass fraction of the system and significantly limit kill vehicle performance, size, and flexibility.

In view of the foregoing, kill vehicles with enhanced midcourse energy management flexibility are needed.

SUMMARY

According to various aspects of the subject technology, a kill vehicle (e.g., a T-sin-alpha kill vehicle) with flexible energy management is described. In some embodiments, the kill vehicle is a part of an interceptor system and can operate in the exo-atmosphere. The flexible energy management method of the subject disclosure applies divert pulses at multiple phases of the kill vehicle flight time and allows for range extension to increase the kill vehicle coverage of targets outside the normal reach, reaction to target updates, removal of navigation error, and homing divert to intercept the target.

In some aspects, a flight vehicle includes a main body including a number of attitude control mechanisms. A control unit is housed in the main body. A divert system is configured to provide acceleration of the flight vehicle in a desired direction. A sensor unit is coupled to a gimbal unit and is configured to track a target along the line of sight (LOS) of the sensor unit. An attitude control system is configured to maintain an orientation of the main body. The divert system includes a multi-pulse motor housed at least partially in the main body. The multi-pulse motor includes more than two divert pulses and is controllable by the control unit.

In other aspects, a flight vehicle includes a main body, a control unit, a multi-pulse divert system, an attitude control system, a gimbal unit, and a sensor unit. The multi-pulse divert system is configured to provide acceleration of the flight vehicle in a desired direction. The attitude control system sustains the main body in a desired orientation. The gimbal unit is attached to the main body, and the sensor unit is coupled to the gimbal unit and tracks a target along the line of sight (LOS) of the sensor unit. The multi-pulse divert system includes a multi-pulse motor housed at least partially in the main body, and the multi-pulse motor is controllable by the control unit. In yet other aspects, a method includes using divert pulses from a multi-pulse divert system to effect in-flight course change of a flight vehicle by initiating a first divert pulse of the multi-pulse divert system to extend a range of the flight vehicle, and remove navigation error. Additional divert pulses are initiated to provide further error removal and to react to target updates. A final divert pulse is initiated prior to a target intercept that continues through target intercept time.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIG. 4 depicts a kill vehicle in a homing phase along with vectors illustrating a T-sin-alpha relationship between thrust vector and a perpendicular thrust vector, according to certain aspects of the disclosure.

FIG. 5 is a conceptual diagram illustrating an example of a flight sequence of a multi-pulse kill vehicle, according to certain aspects of the disclosure.

DETAILED DESCRIPTION

Figure 1:
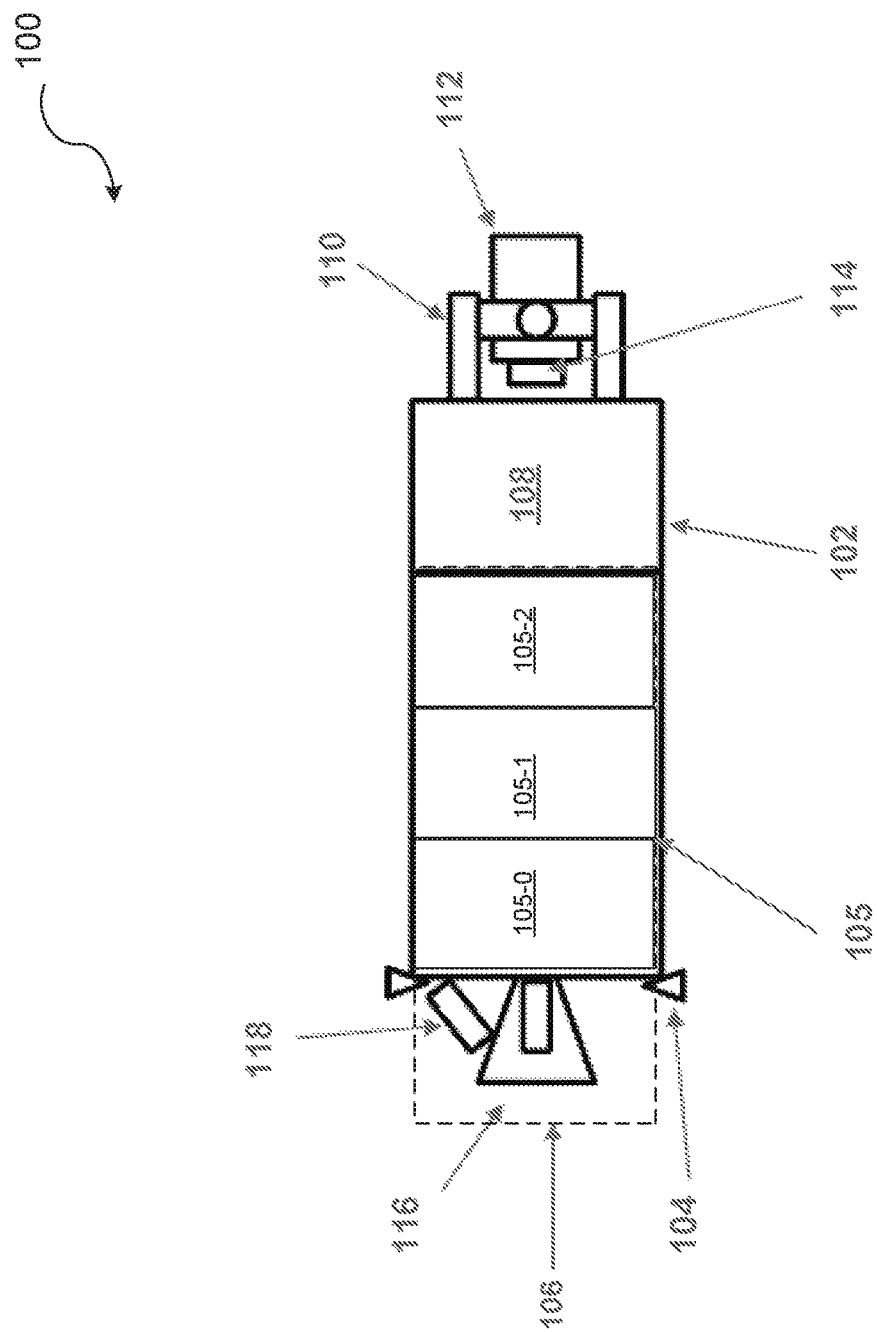
FIG. 1 is a conceptual diagram illustrating an example of a flight vehicle, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to a kill (e.g., a T-sin-alpha kill vehicle) with flexible energy management. In some aspects, the kill vehicle of the subject technology is a part of an interceptor system and can operate in the exo-atmosphere. In some embodiments, the flexible energy management method of the subject disclosure applies divert pulses at multiple phases (e.g., 3 phases) of the T-sin-alpha kill vehicle flight time. The disclosed flexible energy management allows for range extension to increase the kill vehicle coverage of targets outside the normal reach. Further, reaction of the kill vehicle to target updates, removal of navigation error, and homing divert to intercept the target are achieved by the flexible energy management of the subject technology.

Current two-pulse T-sin-alpha kill vehicles have limited mid-course flexibility with respect to the timing of lateral divert and axial acceleration maneuvers. These limitations can reduce the effective mission space of T-sin-alpha concepts in longer time-of-flight or increased handover error scenarios. The subject disclosure proposes a 3-pulse solid rocket motor for enhanced midcourse energy management flexibility and dramatically increased error removal potential and/or velocity or range extension capability of the kill vehicle system. The 3-pulse solid rocket motor of the subject technology can better align with the three key phases of a kill vehicle's flight sequence. The three phases include: (a) error removal and/or range extension; (b) error removal following target acquisition, tracking, and discrimination; and (c) hit-to-kill terminal homing.

Additionally, the disclosed approach can achieve comparable performance and flexibility of liquid divert and attitude control systems (DACSs) with reduced insensitive munitions, safety, and toxicity concerns. Insensitive munitions are munitions that are designed to withstand stimuli representative of severe but credible accidents, and will burn (rather than explode) when subjected to fast or slow heating.

Solid rocket motor technologies under development such as increased inter-pulse delay time, structural insulators, and novel thrust vector control, combined with evolving multi-pulse motors, provide the enablers to achieve the high mass-fraction and reliability required for a T-sin-alpha kill vehicle with significant mid-course energy management flexibility. Application of these technologies can provide increased threat volume coverage by allowing earlier divert to remove booster insertion errors and to react to in-flight target updates. Additionally, this same energy flexibility allows for an increase in battle space through the addition of downrange velocity in the early portion of the flight. T-sin-alpha The subject technology includes a number of advantageous features. For example, the disclosed system provides reduced kill vehicle cost, complexity, and risk along with comparable performance relative to the traditional cruciform divert and attitude control systems. The disclosed system retains much of the energy flexibility of a liquid DACS while removing hazardous fuel leak concerns, which allows for shipboard compatibility. Relative to solid DACS systems, the T-sin-alpha system of the subject technology provides an increase in propulsion mass fraction by reducing part count and increasing fuel loadout, which in turn provides an increase in the total usable velocity and flexibility of the kill vehicle system. Furthermore, the subject solution enables overall smaller kill vehicle sizes.

FIG. 1 is a conceptual diagram illustrating an example of a flight vehicle 100, according to certain aspects of the disclosure. In some embodiments, the flight vehicle 100 can be a kill vehicle delivered by a boost vehicle. The flight vehicle 100 includes, but is not limited to, a main body 102 including a number of attitude control mechanisms 104 coupled to the main body 102, a divert system 106, a control unit 108, gimbal unit 110, a sensor unit 112, and an inertial measurement unit (IMU) 114. The flight vehicle may include other units and components not discussed herein. The divert system 106 includes a multi-pulse motor 105, a nozzle 116, and a nozzle actuator 118. The divert system 106 can be controlled by the control unit 108 and provides acceleration of the flight vehicle in a desired direction under a continuous control of the control unit 108. The multi-pulse motor 105 includes a number of pulses, for example, three pulses 105-0, 105-1, and 105-2. In some embodiments, the three pulses 105-0, 105-1, and 105-2 are solid propellants (e.g., solid rocket fuels). In other embodiments, the three pulses 105-0, 105-1, and 105-2 can be suitably controlled liquid-fuel motors. The three-pulse motor 105 can provide propulsive divert events for the kill vehicle to react to target updates, remove navigation error, and provide terminal homing to intercept the target based on commands from the control unit.

The divert system 106 includes a thrust vector control system that can use one of a number of thrust vectoring control (TVC) technologies including single and multi-nozzle technologies. In some embodiments, the nozzle 116 can be a thrust vectoring nozzle including a fixed or movable nozzle. The nozzle actuator 118 can enable the vectoring of the thrust of the kill vehicle 100 relative to the main body 102. In some embodiments, the nozzle actuator 118 can achieve the vectoring the trust through direct rotation of the nozzle (e.g., the rocket motor nozzle) 116, interrupting the thrust flow through, for example, jet tabs or liquid injection, or variable thrust through multiple nozzles. The flexible energy method doesn't preclude any thrust vectoring types, so long as they can achieve reaction times necessary for intercept.

The control unit 108 is housed in the main body 102 and includes electronic circuitry such as analog and digital circuits. In some embodiments, the control unit 108 can include memory, one or more processors, and suitable firmware and software for implementing flexible energy management, among other command and control tasks. The gimbal unit 110 is coupled (e.g., attached) to the main body 102. The sensor unit 112 is coupled to the gimbal unit 110 and can track a target along a line of sight (LOS) of the sensor unit. The gimbal unit 110 makes it possible to change the angle between the sensor unit 112 (e.g., the LOS of the sensor unit) and an axis (e.g., longitudinal axis) of the main body 102. An attitude control system includes attitude control mechanisms 104 and can maintain an orientation of the main body 102. The IMU 114 is configured to measure angular and translational acceleration of the flight vehicle 100 and to report the measurement results to the control unit 108. In some embodiments, the inertial LOS rate is measured by the IMU 114, in a timely manner, and is used by the control unit 108 to determine the maneuver along a direction perpendicular to the LOS when needed to hit the target.

Figure 2:
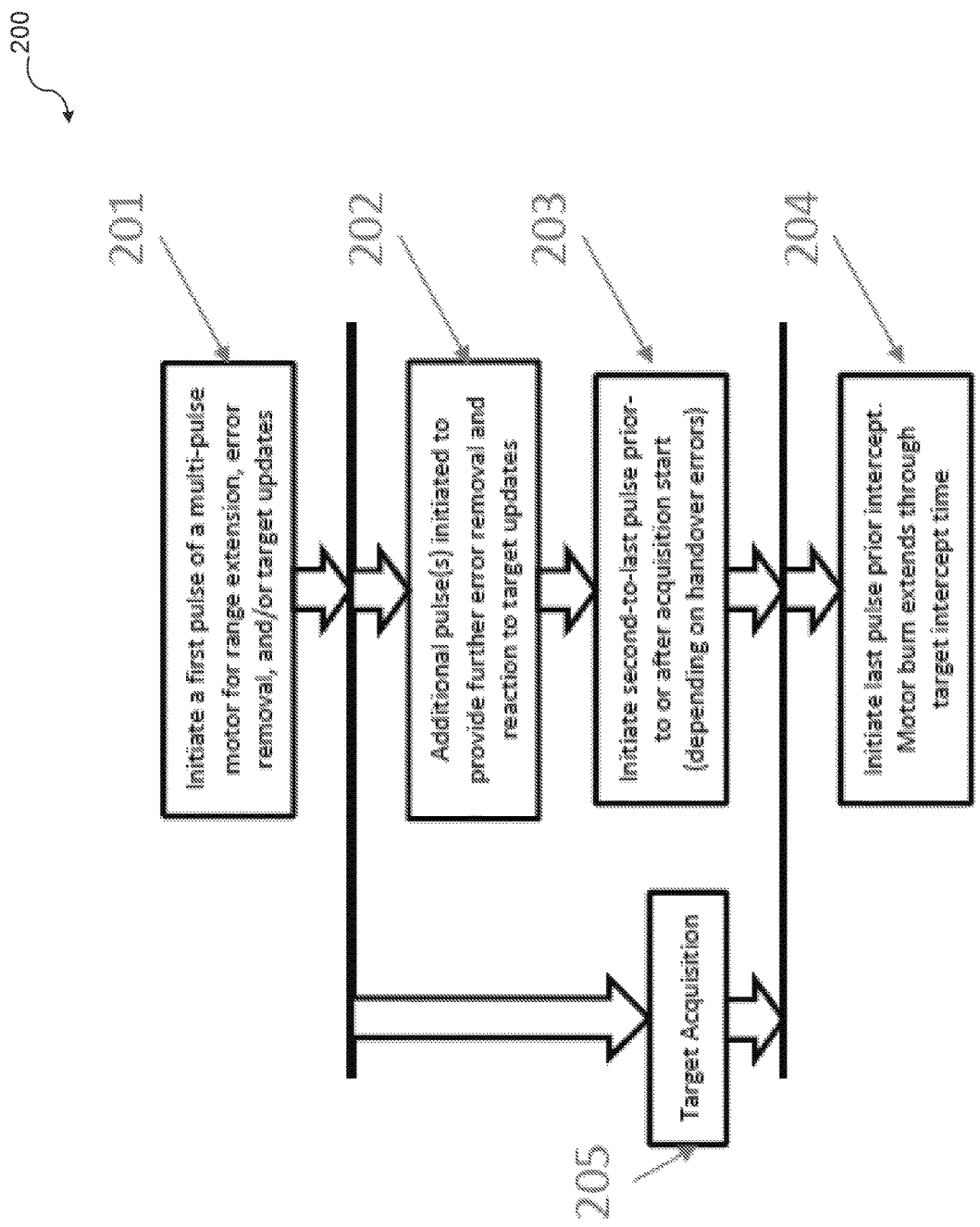
FIG. 2 is a flow diagram illustrating an example of a method and concept for employing a T-sin-alpha kill vehicle (KV) with energy flexibility, according to certain aspects of the disclosure.

FIG. 2 is a flow diagram illustrating an example of a method 200 for employing a T-sin-alpha kill vehicle with energy flexibility, according to certain aspects of the disclosure. The method 200 applies divert pulses at multiple phases of the kill vehicle flight time and allows for range extension to increase the kill vehicle coverage of targets outside the normal reach, reaction to target updates, removal of navigation error, and homing divert to intercept the target. Each of these capabilities is essential to the successful intercept of exo-atmospheric ballistic targets in their mid-course phase of flight. The method 200 depicted in FIG. 2 shows the flexible application of divert pulses, some of which occur independent of the kill vehicle's acquisition of the target.

The first pulse in the method (201) is implemented early in flight to extend the reach of the kill vehicle, remove error, and/or react to target updates. Subsequent pulses (202) can occur during flight to further remove error and/or react to additional target updates. The flexible energy management method can initiate the second to last pulse (203) before or after target acquisition (205) depending on the available information from the battle management command and control system. This second to last pulse (203) removes additional error without the T-sin-alpha guidance (in the case of no acquisition) or with T-sin-alpha guidance (in the case acquisition has occurred). This pulse (203) can also leave a prescribed offset in the intercept trajectory to induce a line of sight rate of the target within the sensor field of view, which allows a passive determination of the range to go. This allows the proper ignition time of the final pulse. The final pulse (204) occurs prior to target intercept and provides the divert velocity and acceleration necessary to intercept a target. The pulse (204) burns through the planned intercept time to assure controllability throughout the engagement.

Figure 3:
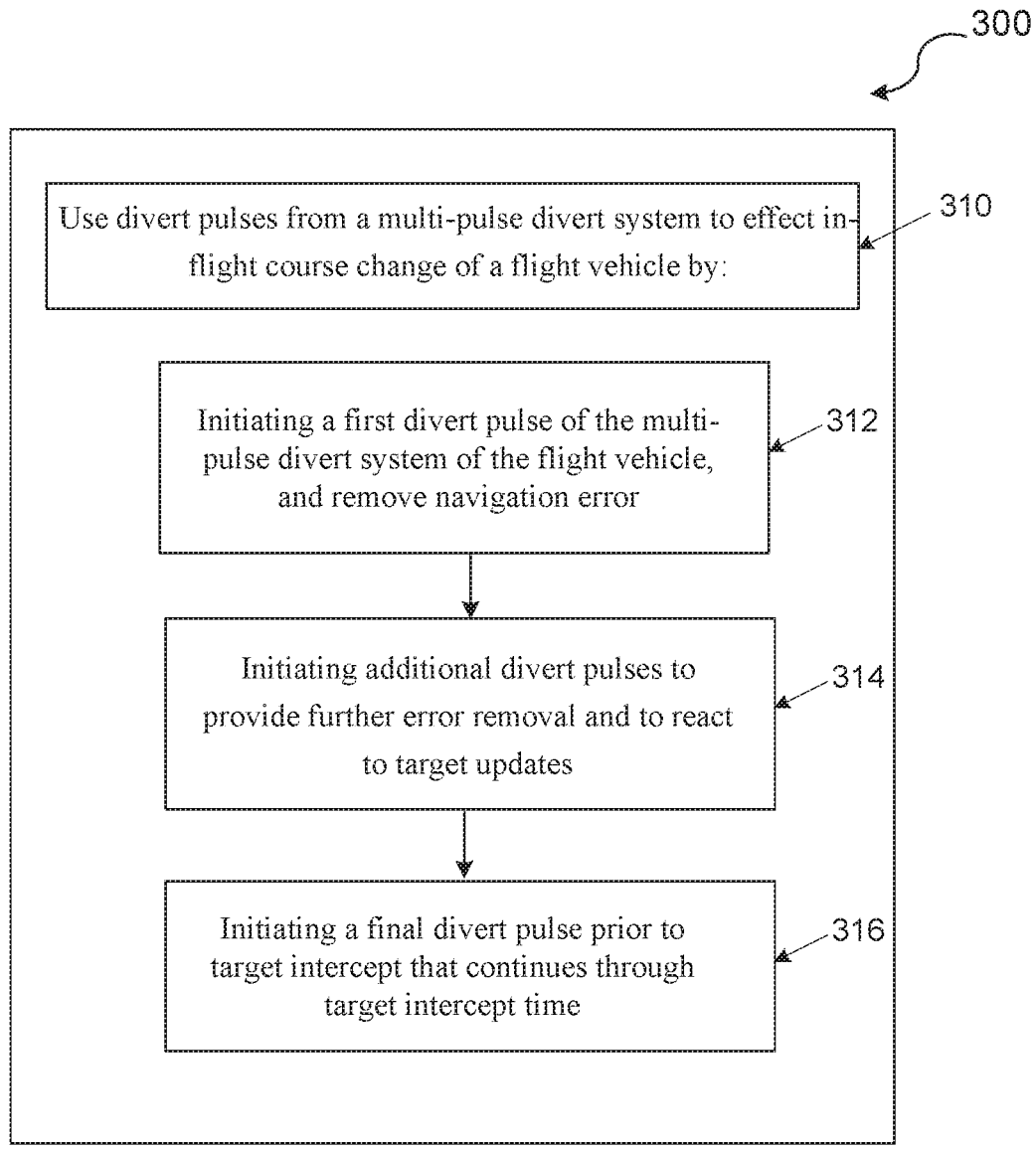
FIG. 3 is a flow diagram illustrating an example method of controlling a multi-pulse flight vehicle, according to certain aspects of the disclosure.

FIG. 3 is a flow diagram illustrating an example method 300 of controlling a multi-pulse flight vehicle (e.g., 100 of FIG. 1), according to certain aspects of the disclosure. The method 300 is an implementation of the flexible energy management of the kill vehicle (e.g., 100 of FIG. 1) of the subject technology, for example, by the control unit 108 of FIG. 1. The method 300 begins with operation block 310, where divert pulses from a multi-pulse propulsion apparatus (e.g., 106 of FIG. 1) is used to effect in-flight course change of a flight vehicle. At operation block 312, a first divert pulse (e.g., 105-0 of FIG. 1) of the multi-pulse propulsion apparatus is initiated to extend kinematic range of the flight vehicle, and remove navigation error. Additional divert pulses (e.g., 105-1 of FIG. 1) are initiated, at operation block 314, to provide further error removal and react to target updates. At operation block 316, a final divert pulse (e.g., 105-2 of FIG. 1) is initiated just prior to intercept and continues through target intercept time.

FIG. 4 depicts a kill vehicle 400 in a homing phase along with vectors illustrating a T-sin-alpha relationship between thrust vector 412 and a perpendicular thrust vector 416, according to certain aspects of the disclosure. The kill vehicle 400, as shown in FIG. 4, has its sensor unit 410 pointed along the line of sight (LOS) 414. The axis 412 of the kill vehicle's main body 402, including the multiple-pulse rocket motor 405 and the control unit 408, is aligned at an angle 404 with the LOS 414. The angle (e.g., alpha) 404 of the body 402 with respect to the line of sight 414 generates a perpendicular component of thrust 416 to the line of sight.410. The perpendicular thrust vector 416 provides the divert velocity and acceleration used to intercept the target. The kill vehicle thrust vector 412 (T), the perpendicular thrust component 416 (D), and the angle 404 (a) are related by the following relationship:

$$D = T \sin \alpha \quad (1)$$

Relationship (1) is known as T-sin-alpha relationship. Thus, any flight vehicle (e.g., 100 of FIG. 1) for which the relationship (1) holds between the thrust vector T and the perpendicular thrust component D, can be called a T-sin-alpha kill vehicle.

FIG. 5 is a conceptual diagram illustrating an example of a flight sequence 500 of a multi-pulse T-sin-alpha kill vehicle, according to certain aspects of the disclosure. The flight sequence 500 shown in FIG. 5 is an example scenario of the use of the increased flexibility that a multi-pulse rocket motor divert system 503 can offer. For example, at event (1), the kill vehicle 501 (e.g., similar to 100 of FIG. 1) is ejected by a dispense mechanism 502 (. At event (2) pulse zero (e.g., 105-0 of FIG. 1) is ignited to provide range extension and remove navigation errors. At event (3), the kill vehicle receives target updates and removes errors with a pulse 1 (e.g., 105-1 of FIG. 1). At event (4), pulse 2 (e.g., 105-2 of FIG. 1) provides divert for hit-to-kill terminal homing.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A flight vehicle comprising:
a main body;
a control unit housed in the main body;
a divert system configured to provide acceleration of the flight vehicle in a desired direction;
an inertial measurement unit (IMU) configured to measure an inertial line-of-sight (LOS) rate of the flight vehicle;
a sensor unit coupled to a gimbal unit and configured to track a target along a line of sight (LOS) of the sensor unit; and
an attitude control system configured to maintain an orientation of the main body, and to use the measured inertial LOS rate to determine a maneuver along a direction perpendicular to the LOS when needed to hit a target,
wherein the divert system comprises a multi-pulse motor housed at least partially in the main body, and a thrust vector control system, and wherein the multi-pulse motor includes more than two divert pulses and is controllable by the control unit.

2. The flight vehicle of claim 1, wherein the flight vehicle comprises a kill vehicle dispensable by an interceptor system, and wherein the kill vehicle is operable in exo-atmosphere.

3. The flight vehicle of claim 1, wherein the IMU is configured to measure angular and translational acceleration of the flight vehicle.

4. The flight vehicle of claim 3, wherein the control unit is configured to plan and execute maneuvers based on external target updates and data received from the IMU and the sensor unit.

5. The flight vehicle of claim 4, wherein the control unit is configured to use the measured angular and translational acceleration of the flight vehicle to provide a navigation solution, thereby allowing the flight vehicle to successfully divert to and locate the target.

6. The flight vehicle of claim 1, wherein the sensor unit comprises at least one of an electro-optic sensor and/or a radio-frequency sensor.

7. The flight vehicle of claim 1, wherein the gimbal unit is configured to allow change of an angle between the LOS of the sensor unit and an axis of the main body.

8. The flight vehicle of claim 1, wherein the flight vehicle comprises a T-sin-alpha kill vehicle with flexible energy management, wherein the flexible energy management is implemented by using the divert system, and wherein the divert system is a multi-pulse divert system.

9. The flight vehicle of claim 8, wherein the multi-pulse divert system is configured to provide range extension and navigation error removal, react to target updates, and provide terminal homing to intercept the target based on commands from the control unit.

10. The flight vehicle of claim 8, wherein the multi-pulse divert system is configured to operate using liquid or solid propellant.

11. The flight vehicle of claim 1, wherein the divert system is configurable to use one of a plurality of thrust vectoring control (TVC) technologies including single and multi-nozzle technologies.

12. A flight vehicle comprising:
a main body including a control unit;
a multi-pulse divert system configured to provide acceleration of the flight vehicle in a desired direction;
an inertial measurement unit (IMU) configured to measure an inertial line-of-sight (LOS) rate of the flight vehicle;
an attitude control system configured to sustain the main body in a desired orientation, and to use the measured inertial LOS rate to determine a maneuver along a direction perpendicular to the LOS when needed to hit a target,
a gimbal unit attached to the main body; and
a sensor unit coupled to the gimbal unit and configured to track a target along a line of sight (LOS) of the sensor unit,
wherein the multi-pulse divert system comprises a multi-pulse motor housed at least partially in the main body, and wherein the multi-pulse motor is controllable by the control unit.

13. The flight vehicle of claim 12, wherein the multi-pulse divert system further comprises a thrust vector control system.

14. The flight vehicle of claim 13, wherein the thrust vector control system is configured to use one of a plurality of thrust vectoring control (TVC) technologies including single and multi-nozzle technologies.

15. The flight vehicle of claim 12, wherein the IMU is configured to measure angular and translational acceleration of the flight vehicle.

16. The flight vehicle of claim 15, wherein the control unit is configured to plan and execute maneuvers based on external target updates and data received from the IMU and the sensor unit, wherein the control unit is further configured to use the measured angular and translational acceleration of the flight vehicle to provide a navigation solution, thereby allowing the flight vehicle to successfully divert to and locate the target.

17. The flight vehicle of claim 12, wherein the gimbal unit is configured to allow change of an angle between the LOS of the sensor unit and an axis of the main body.

18. The flight vehicle of claim 12, wherein the control unit is configured to use the measured angular and translational acceleration of the flight vehicle to provide a navigation solution, thereby allowing the flight vehicle to successfully divert to and locate the target.

19. The flight vehicle of claim 12, wherein the multi-pulse divert system further comprises a nozzle and a nozzle actuator, wherein the nozzle comprises a trust vectoring nozzle including one of fixed or movable nozzle.

20. A method comprising:
using divert pulses from a multi-pulse divert system to effect in-flight course change of a flight vehicle by:
initiating a first divert pulse of the multi-pulse divert system to extend a range of the flight vehicle, and remove navigation error;
measuring an inertial line-of-sight (LOS) rate of the flight vehicle;
using the measured inertial LOS rate to determine a maneuver along a direction perpendicular, to the LOS when needed to hit a target;
initiating additional divert pulses to provide further error removal and to react to target updates; and
initiating a final divert pulse prior to target intercept that continues through target intercept time.

* * * * *